Sept. 15, 1964     R. S. McCLELLAN ET AL     3,148,864
PNEUMATIC CONVEYING AND RECLAIMING METHOD AND APPARATUS
Filed Nov. 2, 1960     4 Sheets-Sheet 1

INVENTOR.
ROBERT S. McCLELLAN
HOWARD W. ADAM
BY

INVENTOR.
ROBERT S. McCLELLAN
HOWARD W. ADAM

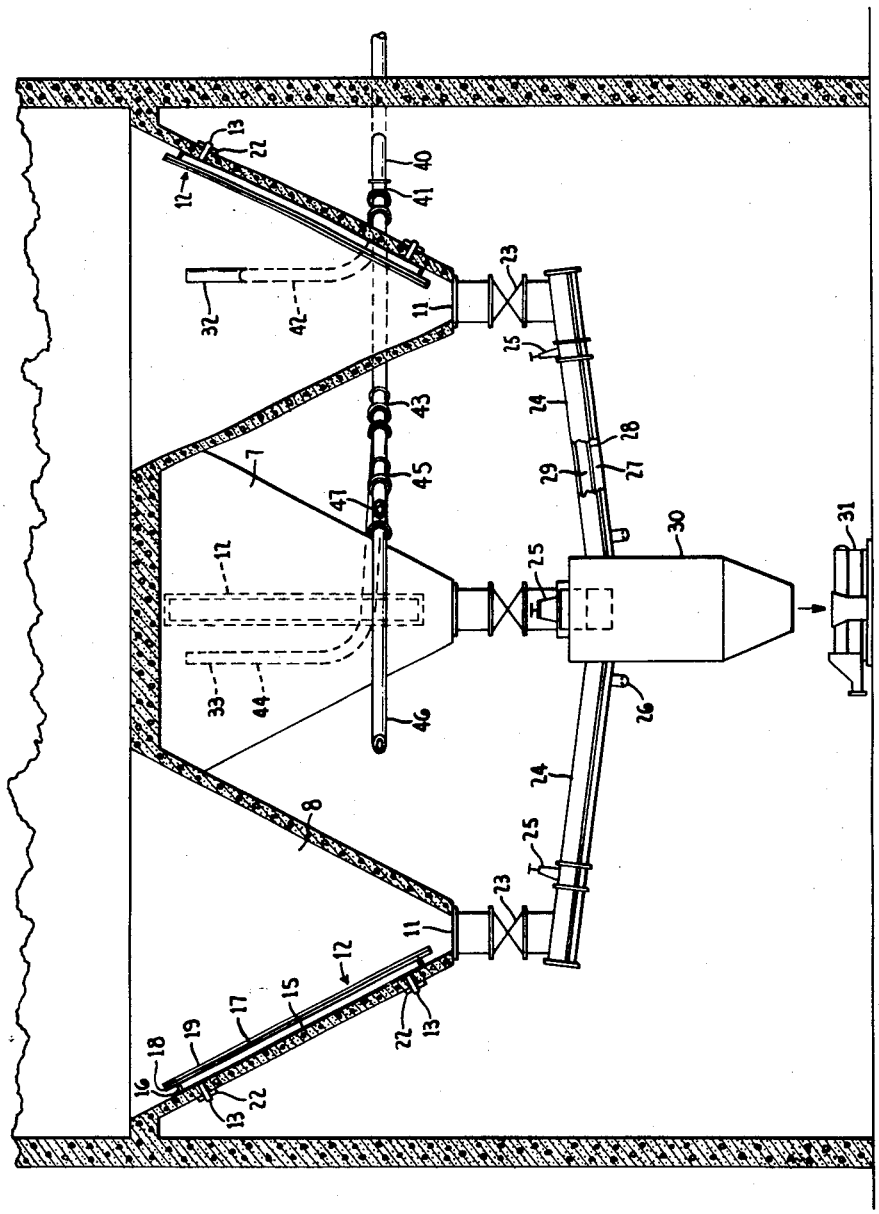

Sept. 15, 1964  R. S. McCLELLAN ET AL  3,148,864
PNEUMATIC CONVEYING AND RECLAIMING METHOD AND APPARATUS
Filed Nov. 2, 1960  4 Sheets-Sheet 4

INVENTOR.
ROBERT S. McCLELLA
HOWARD W. ADAM
BY

United States Patent Office 3,148,864
Patented Sept. 15, 1964

3,148,864
PNEUMATIC CONVEYING AND RECLAIMING
METHOD AND APPARATUS
Robert S. McClellan and Howard W. Adam, Gouverneur, N.Y., assignors to Gouverneur Talc Company, Inc.
Filed Nov. 2, 1960, Ser. No. 66,743
8 Claims. (Cl. 259—4)

The present invention relates to the storage and conveying of pulverulent or granular materials, and is more particularly concerned with the maintenance and improvement of uniformity of the particle size distribution and the composition of such materials in pneumatic conveying systems.

Although a large number of raw-material preparation circuits have been designed in the hope of achieving uniformity of the prepared raw materials, none are entirely successful in themselves. Many industries such as those producing or using cements, chemicals or plastics, as well as the paint and ceramic industries, have found it necessary to employ homogenizing or blending systems to avoid detrimental variations in the physical or chemical characteristics of raw materials.

The trend has been toward large-scale blending by the raw-material producer, thereby permitting large volume work which smoothes out the variations over relatively long production periods.

Examples of prior, large-scale storage-blending-reclaiming systems are shown in Patents No. 1,812,604 to Joseph H. Morrow and No. 2,844,361 to H. J. Dilcher, et al. Patent No. 1,812,604 discloses a layering system in which relatively thin layers of material are deposited in stacks in several silos. The accumulated layers are then withdrawn and, in view of the vertical "rat holes," which form during the discharge of the material portions of each layer are mixed during discharge to average out the variations. However, this system requires a considerable amount of cycling control and sequence timing and may be prone to bridging or stoppage at one or more of the outlets.

Patent No. 2,844,361 discloses an aerated silo having divisions in the aerating floor to permit differential aeration of vertical zones or sectors of the material. A pulsating flow of more intense fluidizing gas is introduced to a selected portion of the aerating floor to cause a circulation of the bin contents. Periodically the more intense gas supply is shifted to another selected portion of the aerating floor. This system, although effective, requires aeration equipment throughout substantially the full floor area of the silo, as well as a relatively complex piping system for the gas supply.

Various other systems have been tried, such as the recirculation of material in a bin by fluid lifts in which air percolates or entrains materials and carries them upwardly through pipes. However, none of the previous expedients have been found to be entirely satisfactory.

In general, the preferred form of the present invention provides a vertically elongated bin or silo having a plurality of material inlets and material outlets therein. Each outlet extends from the lower portion of the material space within the bin, and preferably located at the bottom of a conical discharge drain hopper. Aerating surfaces are positioned along the walls of the discharge drain hoppers and have their lower ends terminating adjacent the respective outlets to aid, by fluidization, the reclaiming or discharge of overlying material. The flow of material through the respective outlets is regulated by flow control valves each individually serving one of the outlets. The several outlet streams from the flow control valves are recombined or delivered to a common point of use or ready storage.

The material inlets are located in a lower region of the silo and open in a generally upward direction. The incoming material is carried in suspension through the inlets in a stream of conveying air or gas. Distributing means permit selective introduction of material through one, or less than the full number of material inlets so that the incoming stream provides a vertical column of loosened, agitated material in which, both the new material and a portion of the old material is mixed. The air-material supply is periodically shifted among the inlets by the distributing means so that agitated mixing zones are successively established about the body of material in the bin.

A better understanding of the invention may be derived from the accompanying drawings and description in which:

FIG. 3 is a vertical sectional view, on an enlarged scale, of a portion of the silo of FIG. 1 showing the inlet and outlet region of the silo;

Figure 1:
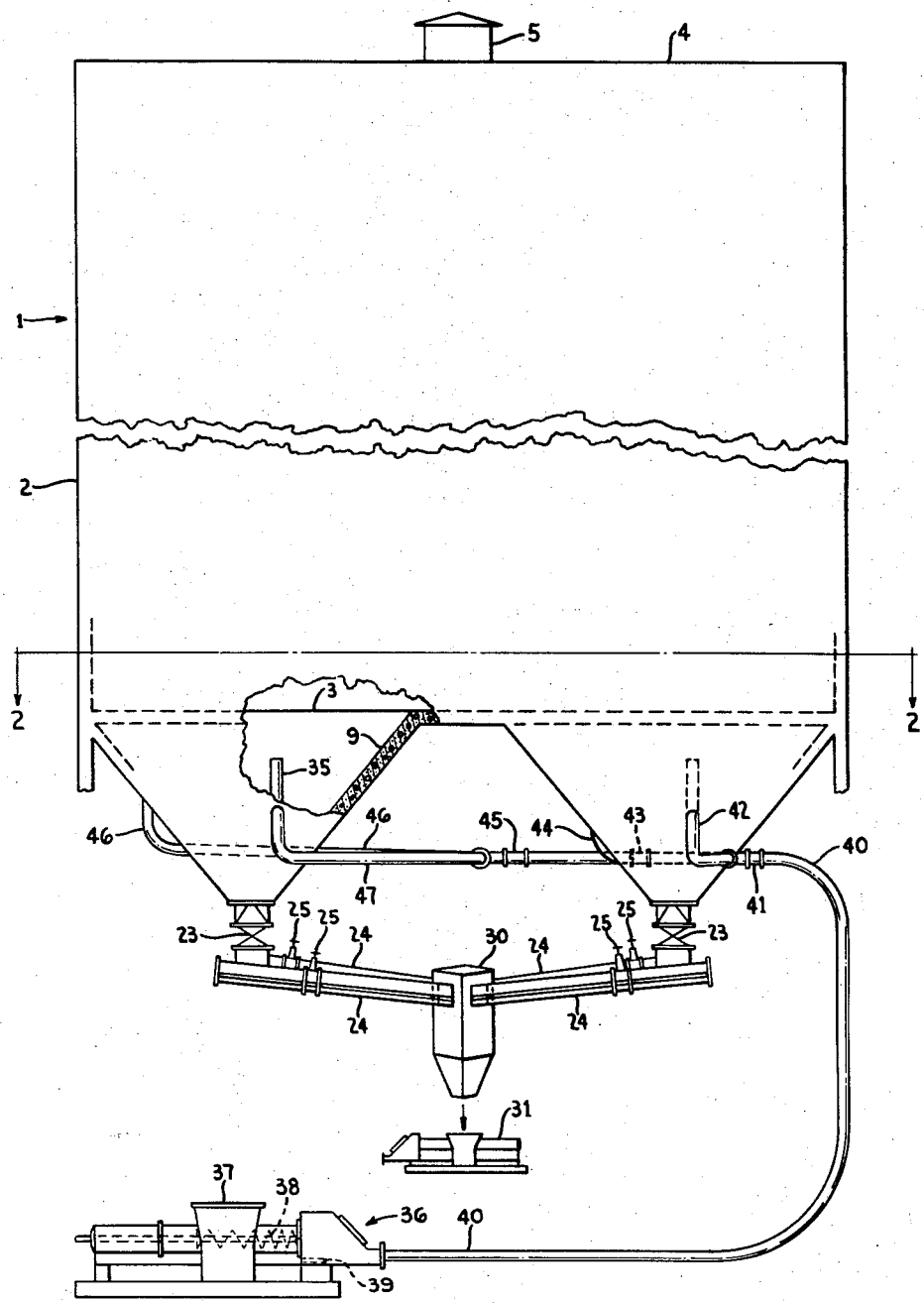
FIG. 1 is a side elevational view, partly in section of a silo embodying the invention.
Figure 2:
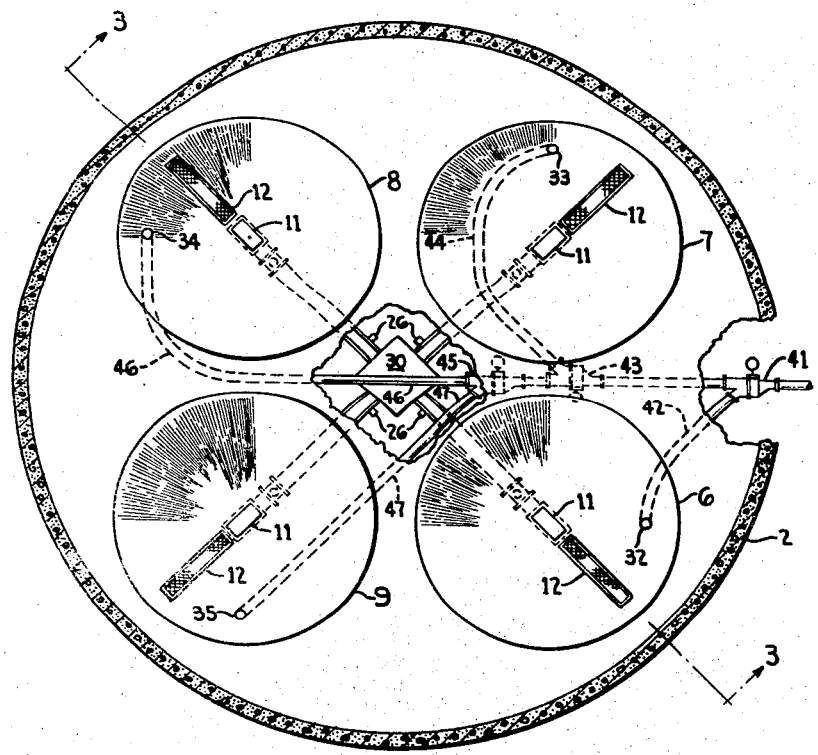
FIG. 2 is a horizontal sectional view taken along lines 2—2 of FIG. 1.
Figure 4:
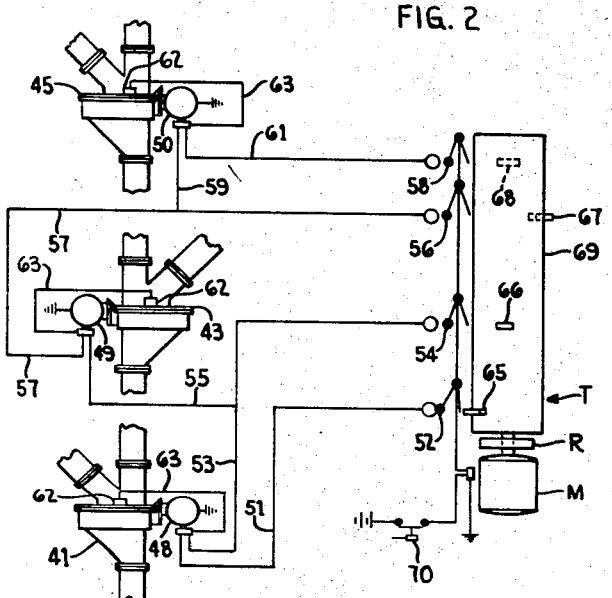
FIG. 4 is a schematic diagram showing the control circuit for the material inlet system.

FIGS. 1 to 4 show the invention as embodied in a single bin or silo 1 which comprises a cylindrical side wall 2, a floor 3, and a top wall 4 having a vent 5 therein. The silo may take any other cross-sectional form if desired. The vent 5 may communicate with a dust collector.

The floor 3 includes a plurality of downwardly-narrowing discharge drain hoppers 6, 7, 8 and 9 which are substantially uniformly distributed with respect to the cross-sectional area of the bottom of the silo, and which terminate at their lower ends as material outlets 11. Instead of the hoppers 6, 7, 8 and 9 being of inverted conical shape, as shown, they may be of the shape of inverted pyramids or other transitional forms. Each of hoppers 6–9 is provided with an aerator 12 extending from a position adjacent its outlet upwardly along its inside wall, and connected to a pair of gas or air-supply pipes 13 which extend to the exterior of the silo. Two or more aerators may be provided for each hopper, if desired, but should be closely associated with the corresponding outlet 11 to ensure fluidization or, at least, substantial aeration of the material above that outlet.

The aerators may be of any suitable form, but the continuous-fabric type disclosed in Patent No. 2,527,455 to H. R. Schemm is preferred. Each aerator 12 comprises a U-shaped channel 15 or plenum chamber 15 to which the gas or air supply pipes 13 are connected. The U-shaped channel or plenum chamber is closed at its ends by suitable end walls 16 and at its upper side by a gas-permeable, flexible fabric deck 17 of the low-permeability type disclosed in the aforementioned Schemm patent. The deck 17 is secured to a flange 18 surrounding the open edge of the channel by a hold-down frame 19 and a plurality of bolts. The air-supply pipes 13 open to the interior of the channel through its bottom wall and serve to secure the aerators to the cone by means of threaded bushings 22.

Each material outlet 11 is provided with a normally open shut-off valve 23, which communicates with an enclosed fluidizing gravity conveyor 24, preferably of the type shown in the aforementioned patent to Schemm. However, alternate unloading conveyors may be used, if desired, if they are capable of providing equal flow rates. The shut-off valves 23 serve to isolate the conveyors 24 for repairs. Each fluidizing conveyor 24 is provided with a flow control valve or gate 25 for regulating of the rate of material flowing through it. The flow control gates are set to provide for equal rates of material flow through the several fluidizing conveyors 24, so that each carries one-fourth of the discharge stream.

Each fluidizing conveyor 24 receives air or gas from a source (not shown) through an air inlet 26 for delivery by an underlying plenum chamber 27 upwardly through a gas-permeable deck 28 to fluidize material in an upper chamber 29 thereof. The fluidizing conveyors slope downwardly toward a common receiving hopper 30 serving a conveyor 31 which carries the material to the desired place of use or storage.

Each of hoppers 6–9 receives one of four upwardly directed material inlet pipes 32, 33, 34 and 35, respectively, which enter the interior of the silo from below through the sloping wall of the respective hoppers.

The inlet pipes 32–35 are served by a pressure-type pneumatic conveying system 36. Although several systems may be used, that known as the "Fuller-Kinyon" system is preferred. The conveying system includes a fluidizing pump 37 charging material via a screw 38 and compressed air via nozzles 39 into a conveying line 40.

A diverter valve 41 in the conveying line 40 communicates via a pipe 42 with the material inlet pipe 32 in hopper 6. Similarly, diverter valves 43 and 45 communicate via pipes 44 and 46 with inlet pipes 33 and 34, respectively. A branch line 47 of the conveying line extends from diverter 45 to the inlet pipe 35.

The diverter valves may be either manually operated or automatically operated, as desired. As shown, the diverter valves 41, 43 and 45 are operated by electrical gear motors 48, 49 and 50. The motor 48 receives power through either of two lines 51 or 53 from switches 52 or 54, respectively. Similarly, the motor 49 receives power through lines 55 and 57, from switches 54 and 56, and motor 50 receives power from lines 59 and 61, from switches 56 and 58. Each of valves 41, 43 and 45 carries a limit switch 62 coupled to the valve mechanism to respond to full motion of the valve in either direction. A line 63 connects the limit switch 62 to the motor controls to disconnect the power thereto when the valve is fully moved from one position to the other.

The switches 52, 54, 56 and 58 are individually actuated by closing cams 65, 66, 67 and 68, respectively, on a drum 69 of a timer T. The timer T is driven through a speed reducer R by a motor M which is controlled by a manual start-stop switch 70.

In operation of the apparatus of FIGS. 1–4, the start-stop switch 70 is closed to start the timer motor M. Consequent rotation of the drum 69 causes the cam 65 to close the switch 52 in line 51, thereby starting the motor 48 to throw the valve 41 for communication of conveying line 40 with branch pipe 42. The limit switch 62 on valve 41 then disconnects the power to the motor 48 to lock the valve in that position. The conveying pump 37 is then started and introduces a mixture of solid, particulate material and the carrying gas, usually air, into the conveying line 40. The air-material stream flows through the conveying line 40, valve 41 and pipe 42 to the inlet pipe 32 in hopper 6 through which it discharges upwardly into the silo. The material is trapped to accumulate in the silo by the temporarily inactive unloading system of conveyors 24 and 31.

When material accumulates in the silo to a substantial level, or if a body of material was already present in the silo, the submerged air-material stream geysering or escaping upwardly from the inlet pipe 32 into one vertical zone of the silo creates a circulatory pattern of material flow in the silo. A portion of the material held in the silo is trapped or drawn into and mixed with the rising stream of new material, and is deposited on the upper surface of the material body. As material flows from the surrounding zones of the silo into the rising material stream, the mass of material in the upper regions falls down to replace it, thereby providing for substantial mixing in the zone affected by the inlet pipe 32. The wider, upper portions of the hoppers provide "turn around" areas for material to flow toward the rising inlet stream.

At a predetermined interval, which may be from a few minutes to several hours or more, the air-material stream is switched to another inlet pipe. Ideally, each of the four inlet pipes of the silo of FIG. 1 should receive material for one-fourth of the total expected loading time. However, variations in some production installations may make an average duration period more practical, since the large masses usually handled in silos can absorb ordinary variations with the provisions of the present invention.

In some cases, such as with silos of small diameter, or with relatively light or easily-handled, fluidizable material, less than four inlet-mixing zones will be required. For example, two inlet pipes on opposite sides of a silo were found to be adequate for powdered talc.

Rotation of the timer drum 69 causes the cams 65 and 66 to open and close switches 52 and 54, respectively. The switch 54 then starts motor 48, via line 53, to re-set or return the diverter valve 41 to its original, through position and, simultaneously, starts the motor 49 to throw diverter valve 43 to deliver material to the pipe 44 leading to the inlet pipe 33 in hopper 7. The material stream discharging upwardly through the upwardly-opening inlet pipe 33 causes a similar geysering and a mixing of "old" material both in itself and with the incoming material.

After similar intervals, the material stream is shifted to inlet pipe 34 by the cam 67 closing switch 56 to return valve 43 and to divert valve 45 to feed the pipe 47 and inlet pipe 35. Continued operation of the timer T causes cam 68 to close switch 58 to return valve 45 to a position feeding the pipe 46 and inlet pipe 34. Any alternate sequence of feeding may be used as desired. For example, the feed may be supplied to inlet pipes 32, 33, 34 and 35 in that sequence.

When material is to be withdrawn from the silo, air is supplied at uniform rates to all the aerators 12, and at different, uniform rates to all the fluidizing conveyors 24. The air delivered through the aerators 12 creates a column of fluidized material above each of the hoppers 6 through 9. The air supplied to the fluidizing conveyors fluidizes the material therein to cause it to flow along the conveying decks 28 to the hopper 30 and to be discharged onto conveyor 31. Upon starting the conveyor 31, material is thus withdrawn from each of the hoppers and is pumped to the point of use or subsequent storage. The hoppers minimize the possibility of dead or stagnant zones of material.

Since the several flow control gates 25 are set for equal flows of material through each of the fluidizing conveyors 24, they ensure an equal rate of material withdrawal from each of hoppers 6–9. Suitable alternate gates or controls may be used to provide for equality of flow from the hoppers.

The cycling, submerged feeding of material upwardly as a geysering stream, the generally uniform fluidized columns, and the equal rate of withdrawal from each hopper provide a system which is particularly effective in obtaining a uniform composition in the material withdrawn. This material is substantially representative of the average composition of the entire contents of the silo.

Since the inlet pipes 32–35 are closely associated with the withdrawal hoppers 6–9, the zones from which material is eventually withdrawn are those which are agitated to the greatest extent. When the aerators 12 are activated, they pre-establish vertical channels or columns of aerated and expanded material. These channels or columns not only prevent bridging or arching over the hoppers, to assure flow through each outlet, but they immediately form into flowing "rat holes" as soon as material is withdrawn from the several outlets. The upper ends of these rat holes frequently may be clearly visible as funnel-like, downward-flowing material depressions in the upper surface of the material body. The rat holes draw material from along their walls for their full height upward from the hopper outlet to and including the upper material surface, thereby further remixing the contents of the silo as the material is withdrawn or reclaimed therefrom.

Although many materials are very difficult to handle and tend to flow only in fits and starts, under normal gravity flow, alternately forming into bridges or arches and then collapsing (which prevents formation of the desired rat holes), the positive aeration of a column of material above each outlet is effective in preventing such difficulties.

Figure 5:
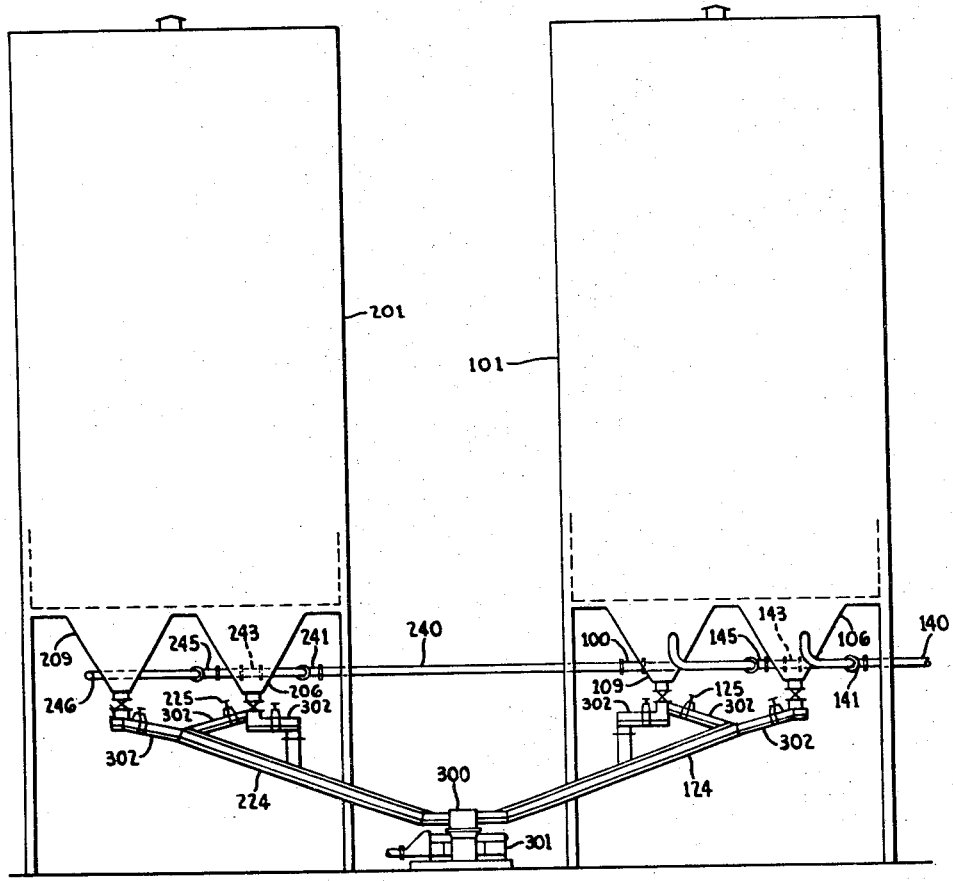
FIG. 5 is a side elevational view of a modified storage, blending and reclaiming circuit embodying the invention.
Figure 6:
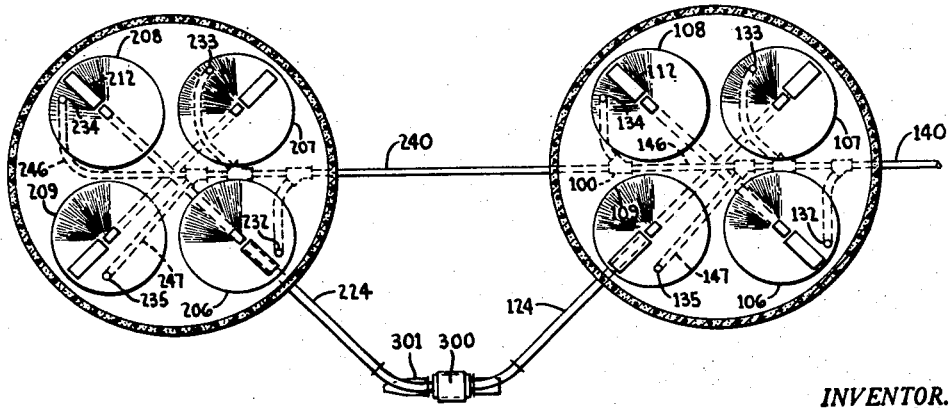
FIG. 6 is a plan view of the installation of FIG. 5.

A modified version of the invention is shown in FIGS. 5 and 6 in which elements corresponding to elements of the silo of FIG. 1 are identified by 100- and 200-series numerals having the same last numbers as those used in FIGS. 1–4.

In FIGS. 5 and 6, a pair of silos 101 and 201, which are similar to the silo of FIG. 1, receive material from a single source and discharge to a single point. The silo 101 receives a conveying line 140 having diverter valves 141, 143 and 145 therein for diversion of the material to inlet pipes 132, 133, 134 or 135 in discharge drains or hoppers 106, 107, 108 and 109, respectively. A branch line 147 serves the inlet pipe 135 and has an additional diverter valve 100 serving a conveying line 240. The conveying line 240 serves a similar system of diverter valves 241, 243 and 245 and inlet pipes 232, 233, 234 and 235 in hoppers 206 to 209 of the silo 202.

A common collecting hopper 300 serving a discharging conveyor 301 receives material from a pair of main fluidizing conveyors 124 and 224 extending from the outlets of the hoppers 107 and 208 of the silos 101 and 102, respectively. Transitional conveyors 302 deliver material from the remaining outlets of the two silos to their respective main fluidizing conveyors 124 and 224. Flow control gates 125 and 225 are provided in the fluidizing conveyors 124, 224 and 302 each adjacent one of the hoppers. Aerators 112 and 212 are provided individually in the hoppers 106–109 and 206–209, respectively, of the two silos.

In operation of the apparatus of FIGS. 5 and 6, material is delivered through the conveying line 140 to any one of the inlet pipes in the hoppers 106–109 of the silo 101, for example, the inlet pipe 132. After a preset interval, the material stream is shifted through the additional diverter valve 100 and conveying line 240 to one of the inlet pipes in hoppers 206–209 of the silo 201, for example, the inlet pipe 232. After a similar interval, the material stream is shifted to one of the three remaining inlet pipes 133–135 of the silo 101, and this alternating cycling is continued throughout the remaining inlet pipes of both silos. Deviations in the characteristics of the incoming material may therefore be divided or split between two material masses. Such deviations are, in a sense, diluted within a substantial total mass of material, rather than having a marked effect upon the material characteristics in only one silo. If desired, more than two such silos may be similarly combined.

Material is withdrawn from both silos 101 and 102 simultaneously, with one-eighth of the total discharge flow being drawn from each of the total of eight outlets. As in the cases of the silo of FIG. 1, the aerators ensure material flow and pre-establish aerated columns above each outlet. The operation of the apparatus of FIGS. 5 and 6 is otherwise similar to that of the silo of FIG. 1.

It may happen, at times, that an excessive change will occur in the new-material characteristics due to broken equipment such as a sizing screen, or that another temporary change or contamination is encountered which markedly affects the material. When this occurs, the resulting problematical material may be restricted to one inlet pipe or one inlet-mixing zone of the silo, and the subsequent withdrawal rate from the outlet beneath that restricted zone may be reduced to, for example, one-half the normal withdrawal rate, or any reduced rate desired.

Referring to the silo of FIGS. 1–4, if a markedly off-color material is suddenly delivered to the silo, for any reason, such off-color material may be restricted to only the one inlet pipe, such as pipe 32 in hopper 6, until the condition is corrected. This may be accomplished by stopping the timer T, thereby preventing cycling of the air-material stream to another inlet pipe. When the material-condition is corrected, subsequent normal material may be cycled among the remaining inlet pipes by manual operation of the valves 43 and 45, or by any suitable electrical modification of the timer circuit adapted to permit locking one valve out of the cycle.

The problem-material above the inlet 32 and hopper 6 is then gradually assimilated by partially closing the flow gate 25 which receives material from the outlet of the hopper 6, while a normal flow is withdrawn from the remaining outlets. If the rate of withdrawal from the hopper 6 is cut in half, for example, its proportionate rate will comprise only one-seventh, or less, of the total withdrawn, instead of one-fourth of the total. The flow gate 25 may be closed to any desired extent, according to the dilution desired.

In this manner the relatively isolated problem-material above the hopper 6 is only gradually reclaimed, and may be diluted or distributed throughout a very large volume or quantity of normal material, thereby reducing the consequent variation of the reclaimed-material characteristics to within acceptable limits. If the silo is part of an installation such as that of FIGS. 5 and 6, the same dilution may be accompanied at a different rate, since the proportionate rate of flow of problem-material would comprise only one-fifteenth of the total flow from both silos to the conveyor 301.

The method and means described herein for introducing material to the silos is disclosed and broadly claimed in an application of Robert S. McClellan, Serial No. 66,799, filed November 2, 1960.

Variations may be made in the specific details of the invention as disclosed without departing from the scope of the appended claims or sacrificing any of the advantages thereof.

We claim:

1. A pneumatic conveying and reclaiming system comprising a bin, at least one gas-material inlet in the lower region of the bin and opening at least partially in an upward direction, means for supplying a gas-material stream to the gas-material inlet, a plurality of material outlets in the bin, and means for simultaneously withdrawing material at proportionate rates from the respective outlets.

2. A pneumatic conveying and reclaiming system as set forth in claim 1 including means for simultaneously withdrawing material at equal rates from the respective outlets.

3. A pneumatic conveying and reclaiming system as set forth in claim 2 in which the material outlets are uniformly distributed with respect to the cross-sectional area of the bin, and the gas-material inlets are individually adjacent the material outlets.

4. A pneumatic conveying and reclaiming system as set forth in claim 1 which includes an aerator adjacent each of the outlets.

5. A pneumatic conveying and reclaiming system comprising a silo having a floor, a plurality of downwardly-narrowing hoppers uniformly distributed in the floor, an inlet pipe in each hopper and positioned to open upwardly therein, a conveying line having a plurality of branches each communicating with one of the inlet pipes, means for supplying a gas-material stream to the conveying line, diverter means for selectively diverting the gas-material stream individually to selected inlet pipes at intervals, each hopper having a material outlet therein, an aerator adjacent each outlet, means for passing an aerating gas through each aerator to fluidize overlying material, and means for causing simultaneous proportionate rates of material discharge through the respective outlets.

6. A pneumatic conveying method for conditioning and reclaiming pulverulent or granular materials comprising establishing a confined mass of the material, entraining further material in a stream of gas, passing the gas-material stream upwardly into the lower portion of a zone of the material mass, periodically shifting the gas-material stream to pass upwardly into the lower portion of a different zone of the material mass, and withdrawing material at simultaneous proportionate rates from each such zone of the material mass.

7. A pneumatic conveying method for conditioning and reclaiming pulverulent or granular materials comprising establishing a plurality of confined masses of material, entraining further material in a stream of gas, passing the gas-material stream upwardly into the lower portion of a zone of one of the material masses, periodically shifting the gas-material stream to pass upwardly through individual zones of different material masses in succession, fluidizing and withdrawing material at simultaneous proportionate rates from each such zone of each of the material masses and commingling the material withdrawn from the respective zones.

8. A blending system comprising a bin, means for introducing a stream of material generally upwardly within the lower portion of the bin to cause mixing of the material within the bin, a plurality of material outlets evenly distributed with respect to the cross-sectional area of the bin, means for simultaneously withdrawing material by proportionate rates from the respective outlets and an aerator in the bin adjacent each material outlet.

References Cited in the file of this patent
UNITED STATES PATENTS

| | | |
|---|---|---|
| 2,171,399 | Hastert | Aug. 29, 1939 |
| 2,665,035 | Schemm | Jan. 5, 1954 |

FOREIGN PATENTS

| | | |
|---|---|---|
| 58,443 | Sweden | Mar. 10, 1925 |
| 534,993 | Belgium | Feb. 15, 1955 |
| 541,541 | Italy | Apr. 4, 1956 |
| 669,533 | Germany | Dec. 29, 1938 |
| 1,032,225 | Germany | June 19, 1958 |